UNITED STATES PATENT OFFICE 2,143,960

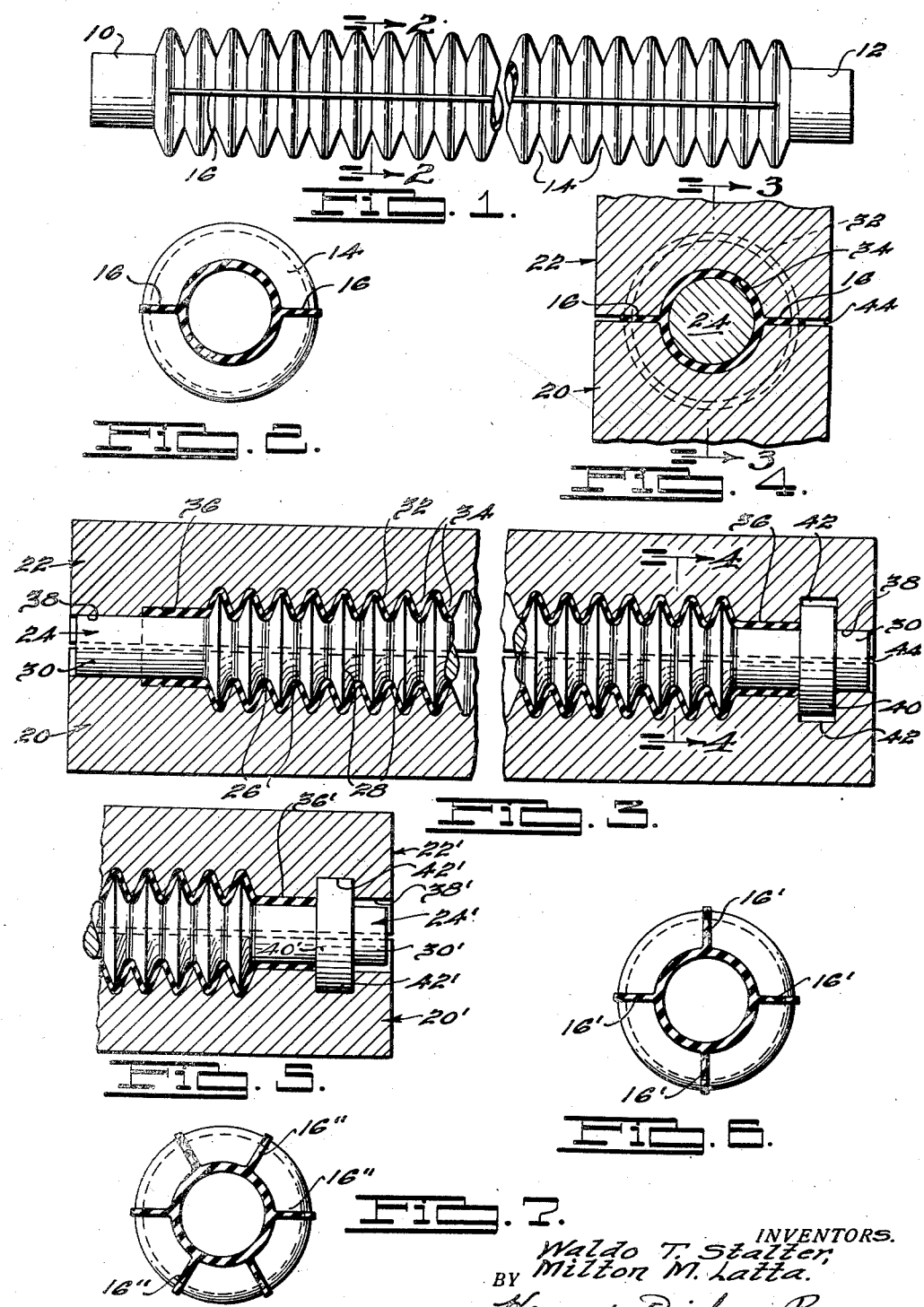

NONKINKING HOSE

Waldo T. Stalter and Milton M. Latta, Goshen, Ind., assignors to Western Rubber Company, Goshen, Ind., a corporation of Indiana Application June 14, 1937, Serial No. 148,024

2 Claims. (Cl. 138—49)

This invention relates to rubber hose and particularly to a type thereof resistant to kinking whereby it is particularly adaptable for use in connection with masks, respirators and the like.

Objects of the invention include the provision of a novel non-kinking hose structure; the provision of a non-kinking hose structure formed entirely of rubber; the provision of a rubber hose of corrugated conformation provided with longitudinally extending integral ribs or webs connecting the corrugations; the provision of a rubber tube provided with a plurality of circumferentially extending corrugations over the length thereof and axially extending webs or ribs extending longitudinally of the corrugations and formed integrally therewith; the provision of a non-kinking hose that is highly resistant to stains and the like and may be readily cleaned without affecting the character of the hose material; the provision of a non-kinking hose that is relatively resistant to becoming snagged on sharp projections; and the provision of a corrugated hose that is simple in construction and economical to produce.

Further objects of the invention include the provision of molding apparatus for hollow rubber articles including cooperating cavity plates and a core pin, the cavity plates and the core pin being so constructed and arranged as to provide a novel means for maintaining the axial position of the core pin with respect to the cavity plate; and the provision of molding apparatus for molding corrugated rubber hose including complementary cavity plates provided with corrugated cavities therein, and a corrugated core pin, the core pin being provided with a collar or flange fixed with respect to at least one end thereof and the cavity plates being provided with recesses for reception of the collar whereby to accurately locate the core pin with respect to the cavity plate and the cavity plates with respect to each other.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Figure 1 is a partially broken, side elevational view of a non-kinking hose formed in accordance with the present invention;

Fig. 2 is an enlarged transverse sectional view taken on the line 2—2 of Fig. 1;

Fig. 3 is a fragmentary vertical sectional view taken centrally through a pair of cavity plates and co-operating core pin, taken as on the line 3—3 of Fig. 4, providing a mold for forming the hose shown in Figs. 1 and 2, the hose being shown in molded condition therein;

Fig. 4 is a fragmentary transverse sectional view taken on the line 4—4 of Fig. 3;

Fig. 5 is a fragmentary view similar to Fig. 3 but illustrating a modified form of construction thereof;

Figs. 6 and 7 are views similar to Fig. 2 but illustrating modified forms of construction.

In gas masks and respirators it is obviously important that the flexible hose connecting the mask proper with the canister containing the gas absorbent material be of a type that is not liable to kink and thereby shut off the breathing of the wearer and, accordingly, it has been common practice to form these hoses with circumferential grooves providing corrugations extending over substantially the full length of the hose. In the past in making such tubes the practice has been to wrap a sheet of rubber, or wrapping a strip of rubber in spiral form on a corrugated mandrel, covering this with a tube of knitted fabric commonly referred to as a "stockinette", and wrapping the entire assembly on the form or mandrel with a bandage in which state the assembly is placed in a steam heater for vulcanization. The hose thus formed by this method is open to objection for the reason that the wrapping method of construction is of necessity performed more or less by hand and because of this, it is almost impossible to arrive at anything like a uniform thickness throughout the length of the hose. This lack of uniformity results in some thin areas and if these are quite pronounced, the result, of course, is a collapse of the hose at the area or areas of thinness and a defeat of the non-kinkable feature. Moreover the bandage or wrapper which is applied over the stockinette in this method of construction is also applied by hand which results in an uneven pressure at various points on the hose during the vulcanization operation and this results in variation in the density of the vulcanized material. Such variations in density cause weakness of the structure at the low pressure areas and this also aids in defeating the non-kinkable feature of the hose. Additionally, the stockinette fabric cover on the hose which is bonded to the rubber in the curing process very readily becomes stained or saturated with liquids and cannot be easily cleaned with cleaning fluids which attack the vulcanized rubber underneath and thus weaken or destroy the hose. The fabric cover of the hose, is of course, not perfectly smooth and threads of the cotton fabric can be very readily snagged or torn by sharp or pointed objects and whenever this occurs, the wall of the hose is weakened or opened.

In accordance with the present invention the disadvantages of such corrugated non-kinking hoses as have heretofore been made is effectively eliminated by forming such hose by a molding operation wherein it is possible to obtain absolutely uniform wall thickness throughout the length of the hose, to obtain the same density of material throughout all areas of the hose, and to completely eliminate the stockinette cover thereby leaving the surface of the hose in a smooth condition not readily caught on sharp or pointed objects and susceptible to ready cleaning when the occasion arises. Additionally by the use of a molded rubber hose uniform vulcanization of the rubber throughout all areas of the same is assured. This ability to produce a corrugated hose of the type described having uniform wall thickness throughout with equal density and degree of vulcanization serves to permit the production of such a hose devoid of any weak spots throughout its length and consequently providing uniform resistance to kinking throughout its length. Furthermore in accordance with a further phase of the present invention it has been found that by providing webs or ribs formed integrally with the hose and extending transversely of the direction of the corrugations therein the non-kinking features of the same may be materially enhanced.

In the production of a molded corrugated hose or tubes of the type described it will be apparent that it is essential that the core be accurately and positively located in an axial direction with respect to the cavities in the cavity plates during each molding operation for otherwise any shifting of the core axially thereof with respect to the cavity plates would result in variation in the wall thickness of the tube or hose formed thereby. One feature of the present invention is a core and cavity plate structure which will insure accurate axial alignment of the mold parts during the molding operation to overcome the possible disadvantages that might otherwise occur.

Referring now to the accompanying drawing, in Figs. 1 and 2 is illustrated a tube or hose of the type under discussion formed in accordance with the present invention. As will be noted this hose is formed preferably completely of suitable rubber stock to provide a pair of cylindrical end portions 10 and 12, respectively, which serve to provide means for facilitating the connection of the hose with a gas mask and a canister or between other suitable objects. The main body portion of the hose is formed to provide a plurality of circumferentially extending grooves or annular recesses 14 providing a corrugated surface over substantially the full length of the tube. As best indicated in Fig. 3 the wall thickness of the corrugated portion of the tubes is uniform throughout its length but the cylindrical end portions 10 and 12 may be of a different and are preferably of a greater thickness. The hose shown in Figs. 1 and 2 is formed entirely of rubber stock without any fabric cover of any type whatever, thereby permitting washing of the hose whenever required to remove any stain, dirt, dust or the like therefrom. Furthermore, the hose, being the product of a molding operation, will take on a finish of the outer surface complementary to the finish of the cavity in the cavity plate, and where the walls of such cavities are of the desired smooth character, the surface of the tube will be equally smooth and not susceptible to readily catching on pointed or sharp projections.

In accordance with a further phase of the present invention, it will be noted that the hose shown in Figs. 1 and 2 is provided at diametrically opposite sides thereof with a web or fin 16, the webs or fins 16 preferably being disposed at diametrically opposite sides of the hose and with the plane of their thicknesses disposed radially with respect to the axis of the tube. The webs or fins 16 are preferably continuous from one end of the corrugated portion of the hose to the opposite end, are formed integrally with the hose, and preferably of such depth as to extend the full depth of the grooves 14 and, where desired, may project a slight amount beyond the peripheral portion of the hose as indicated in Fig. 2. The webs or fins 16 being formed from the same material as the hose, are flexible and preferably of such a nature that when the hose is bent if one of the webs or fins is located at the rear edge of the bend it will fold upon itself between the corrugation so as not to materially interfere with such bending action, while the webs or fins at the outer edge of the bend act as tension members between adjacent corrugations and act to resist such bending action. Likewise any tortional forces applied to opposite ends of the hose act to place both of the webs or fins 16 under tension and thus act to reinforce the hose against the collapsing action which naturally tends to occur under tortional stresses in the tube. While the thickness of the fins or webs 16 may be varied to a greater or lesser extent in order to obtain a desired effect thereof, and ordinarily will be of greater thickness on hoses of larger diameter than on hoses of small diameter, it has been found that webs or fins approximately of ⅒nd inch in thickness are satisfactory for use in connection with tubes of approximately one and one-half inches maximum outside diameter.

In the broader sense the above described fins or webs 16 may take the form of the ordinary flash which occurs during a molding operation and the outer edge of which is trimmed in a straight or scalloped line to allow the flash to remain as a permanent part of the tube in fin or web-like form. To obtain the desired extent of fin or web in such case, however, it will be obvious that sufficient rubber stock must be applied to the mold to insure the production of a flash or fin of the desired extent. Preferably, however, the mold has and in some cases the core pin, as in the case of the apparatus shown and later described, are so constructed and arranged as to provide a definite separation of the cavity plates when finally forced home about the core pin for the vulcanization operation thereby to positively assure the production of a fin or web of the desired thickness and which thickness may thus be accurately controlled.

Referring now to Figs. 3 and 4 the co-operating cavity plates are illustrated at 20 and 22, respectively, and the core pin generally at 24. As shown, the core pin 24 is of an external size, shape and contour complementary to the desired size, shape and contour of the interior of the hose or tube to be formed. In other words it has a central portion provided with circumferential grooves 26 forming ribs 28 therebetween to provide a corrugated effect for the central portion of the hose. The core pin 24 also has cylindrical end portions 30 corresponding in external diameter to the internal diameter desired in the end portions 10 and 12, respectively, of the completed hose, but these cylindrical end portions 30 are extended beyond the desired length of the end portions 10 and 12 of the hose for the purpose of providing a support for the core pin in the cavity plate.

Each of the cavity plates 20 and 22 is provided with a recess therein complementary in size, shape and contour to approximately one-half of the exterior dimension of the completed hose. In other words the cavity in each of the cavity plates 20 and 22 is substantially semi-cylindrical in transverse section, the central portion thereof is provided with semi-annular grooves 32 forming ribs 34 therebetween, and the end portions 36 of the cavities are of a semi-cylindrical nature and of a diameter corresponding with the external diameter of the end portions 10 and 12 desired in the final product. The extreme end portions 38 of the cavities in the cavity plates 20 and 22, respectively, and which are indicated at 38, are, in the construction shown in Figs. 3 and 4, semi-cylindrical and of a size complementary to the end portions 30 of the core pin 24 so as to accurately receive the same therein.

One end portion 30 of the core pin 24 is provided with a circular enlargement 40 thereon forming a radially projecting flange or collar intermediate the ends of corresponding portion 30. The cavity plates 20 and 22 are each provided with a semi-cylindrical recess 42 therein shown as being of a larger diameter than the diameter of the portion 40 but of a width substantially identical to the width of the portion 40. In the construction shown the recesses 42 are shown as dividing the corresponding portions 36 and 38 of the mold cavities from one another and consequently when the core pin is in position between the cavity plates the portion 40 limits the length of the cylindrical connecting portion 12 formed in the completed hose. The length of the portion 36 in the cavity plates 20 and 22 at the opposite end of the cavity plates is made of a length corresponding to the length of the portion 10 desired in the finished hose and consequently determines the length of this portion.

It will be apparent that if the wall thickness of the finished hose is to be uniform throughout the main body portion thereof, the corrugated portions of the core pin 24 must be accurately positioned with respect to the complementary corrugated portions of the cavities in the cavity plates 20 and 22. In the past it has been conventional practice in locating a core pin with respect to the cavities in cavity plates to provide small dowel pins in the cavity plates over which the core pin is placed, the core pin being provided with a hole drilled through it for reception of the dowel pins. These dowel pins are frequently sheared by the molding pressure and the holes in the core pins for reception of the dowel pins frequently become enlarged through wear or otherwise to such an extent that a degree of axial movement of the core pin with respect to the cavity plates soon develops which would render such construction entirely inadvisable for use in connection with a construction such as is here disclosed requiring accurate control of all portions of the wall thickness of the finished product.

In accordance with one phase of the present invention the provision of the flange 40 on the core pin 24 and the cooperating recesses 42 in the cavity plates 20 and 22 obviate the disadvantages of conventional practice in the above respect. This is for the reason that the flange portion 40 is preferably formed integrally with the core pin 24. As will be apparent this is easily accomplished during the usual machining operations employed in forming the core pin 24. Being formed integrally with the core pin it will also be understood that there is no possibility of the flange 40 shifting with respect to the core pin. The recesses 42 are machined in the cavity plates during the same operation and by the same type of operation as is employed for forming the remaining portion of the cavities and consequently no shifting of this locating portion of the cavity plate is possible. Furthermore, in view of the relatively large area of engagement between the flange 40 and the walls of the recesses 42 in the cavity plates it will be apparent that when all three are assembled there is no possibility of one shifting with respect to the other and the liability of looseness developed through wear of these engaging parts is so remote as to be negligible. It will also be understood that the inter-engagement of the flange 40 of the recesses 42 in both cavity plates 20 and 22 provides a positive and definite means for locating the cavity plates 20 and 22 longitudinally with respect to each other. The transverse alignment of the cavity plates 20 and 22 is, of course, accomplished by inter-fitting of the end portions 30 of the core pin 24 in the cavity portions 38 of the cavity plates 20 and 22, the same being formed complementary in size, shape and contour so as to positively effect this result.

Where it is desired to form the fins or webs 16 on the finished product as above described the cross-sectional configuration of the cavities in the cavity plates 20 and 22 are preferably slightly less than a full semi-circle so that when all of the parts are assembled in final relationship as indicated in Figs. 3 and 4 the cavity plates 20 and 22 are separated from one another by a slight amount such as at 44 equal to the thickness of the desired fin or web 16 desired to be formed on the finished product. The result of this construction is, of course, obvious.

In forming the hose shown in Figs. 1 and 2 by the apparatus illustrated in Figs. 3 and 4, a suitable layer of rubber stock of the desired type and of the required amount is first positioned in the cavity of one of the cavity plates 20 or 22, the core pin 24 is then positioned in such cavity plate, its upper surface is overlain with another strip or layer of rubber stock of the required character and mass, and then the remaining core plate 20 or 22 is applied in place and pressure is applied in a suitable or conventional manner to urge the cavity plate 20 or 22 towards one another and the whole assembly is then subjected to a suitable vulcanizing temperature in accordance with conventional practice. During the vulcanization steps the cavity plates 20 and 22 are brought into and maintained in accurately positioned relationship with respect to each other and the core pin 24, and excess amounts of the rubber stock required to form the main body portion of the hose shown in Figs. 1 and 2 is squeezed out into the spaces 44 between the cavity plates and thus form the fins or webs 16. After the vulcanization step is completed and after the mold has cooled to a sufficient extent the core pin with the hose formed thereon is removed from between the cavity plates, the hose is removed from the core pin 24 by any suitable method such as by inflation with an air hose in accordance with conventional practice, that portion of the rubber stock that has been extruded out through the space 44 between the cavity plates 20 and 22 is trimmed off along its outer edges along the straight, scalloped or other desired shape, and that portion thereof which has been formed on the end portions 10 and 12 of the hose trimmed off in its entirety thereby completing the final desired product having all of the characteristics heretofore described as being desirable in a product of this type.

In Fig. 5 is shown a slight modification of the right-hand end of the construction shown in Fig. 3. Parts corresponding to the parts shown in Figs. 3 and 4 are indicated by the same numerals except that such numerals bear a prime mark. The only difference in the construction shown in Fig. 5 from that shown in Figs. 3 and 4 is that the flange 40' in Fig. 5 is not only employed to locate the cavity plates 20' and 22' and the core pin 24' axially with respect to each other, but also serves to transversely align these parts with respect to each other at this end of the mold. To accomplish this the flange 40' in this instance is made of an external diameter corresponding substantially exactly with the diameter of the semi-cylindrical depression 42' in which it is received and, therefore, its exterior surface bears against the inner surfaces of the recesses 42' when in assembled relation with respect thereto. In this case the portions 36' and 38' of the cavities in this end of the cavity plates may, of course, be constructed of the same diameter as indicated merely as an aid in easy production of the same. The effect of the construction shown in Fig. 5 is, of course, identically the same as that shown in Figs. 3 and 4.

In Figs. 6 and 7 modifications of the construction shown in Figs. 1 and 2 are illustrated, these modifications involving only the number of webs or fins such as the webs or fins 16 in Figs. 1 and 2, in the final product. In Fig. 6 the tube is provided with four fins 16' in which case the fins or webs 16' are arranged in equally angularly spaced relation about the axis of the hose. In Fig. 7 the webs or fins 16" are six in number and are also preferably arranged in equally angularly spaced relation about the axis of the hose. It will be understood that the additional webs or fins such as shown in Figs. 6 and 7 may be formed by constructing the cavity plates in a greater number of parts than shown in Figs. 3 and 4, but will preferably be formed by milling or otherwise machining corresponding slot-like recesses in cavity plates of the same character as indicated in Figs. 3 and 4.

It will be understood that the hose as shown in Figs. 3 and 4 and described in connection therewith after having been removed from the mold and stripped from the core pin 24 and having the webs and fins and/or flash suitably trimmed or removed therefrom constitutes the final product and includes no stockinette covering as is employed in conventional constructions. It will also be understood that where the hose is properly made in accordance with the manner described the wall thickness will be uniform throughout the entire area of the corrugated portions, the surface will be smooth and easily cleaned, and particularly where the webs or fins 16 are employed a hose of maximum non-kinking characteristics is produced.

Formal changes may be made in the specific embodiments of the invention described without departing from the spirit or substance of the broad invention, the scope of which is commensurate with the appended claims.

What we claim is:

1. A flexible non-kinking hose formed solely of rubber and comprising a main body portion corrugated throughout its length, and a plurality of rubber webs extending in the direction of the length of said hose and interconnecting adjacent corrugations thereof, said webs being formed integrally with said main body portion and being of such thickness as to be substantially non-resistant to compressive stresses.

2. A flexible non-kinking hose comprising a hollow main body portion of corrugated conformation having a wall thickness substantially constant throughout its length, and longitudinally extending integrally formed rubber webs interconnecting adjacent faces of adjacent corrugations thereof, said webs being of such thickness as to be substantially non-resistant to compressive forces whereby to enable them to fold on themselves at the inner side of a bend when said hose is bent, and serving as tension members between adjacent faces of adjacent corrugations on the outer side of a bend when the hose is bent.

WALDO T. STALTER.
MILTON M. LATTA.